United States Patent [19]
Watanabe et al.

[11] Patent Number: 4,749,924
[45] Date of Patent: Jun. 7, 1988

[54] DRIVE SYSTEM FOR A VEHICLE ACCESSORY

[75] Inventors: Makoto Watanabe, Aichi; Isaku Kawashima, Kosai, both of Japan

[73] Assignees: Nippondenso Co., Ltd., Kariya; Asmo Co., Ltd., Kosai, both of Japan

[21] Appl. No.: 62,778

[22] Filed: Jun. 15, 1987

[30] Foreign Application Priority Data

Jun. 27, 1986 [JP] Japan .................................. 61-152305

[51] Int. Cl.4 ............................................. H02H 7/085
[52] U.S. Cl. .................................... 318/474; 318/286; 318/466
[58] Field of Search ............... 318/255, 256, 264, 265, 318/266, 267, 280, 283, 286, 293, 294, 430, 434, 466, 467, 468, 469, 474; 307/10 R

[56] References Cited

U.S. PATENT DOCUMENTS

| | | | |
|---|---|---|---|
| 4,338,552 | 7/1982 | Pilz et al. | 318/266 |
| 4,373,149 | 2/1983 | Coste | 318/256 X |
| 4,394,605 | 7/1983 | Terazawa | 318/256 X |
| 4,672,278 | 6/1987 | Ingraham et al. | 318/283 |
| 4,678,975 | 7/1987 | Vrabel et al. | 318/256 X |

FOREIGN PATENT DOCUMENTS

| | | | |
|---|---|---|---|
| 57-16587 | 1/1982 | Japan | 318/469 |
| 60-43903 | 3/1985 | Japan | |
| 61-18375 | 1/1986 | Japan | |

*Primary Examiner*—Bentsu Ro
*Attorney, Agent, or Firm*—Cushman, Darby & Cushman

[57] ABSTRACT

A motor serves to move a vehicle movable accessory. When the accessory is required to move, the motor is activated. Load on the motor is sensed. When the sensed load exceeds a reference level, the motor is deactivated. After the motor is deactivated, a device inhibits activation of the motor which induces movement of the accessory in a direction same as a direction of movement of the accessory during a period preceding the deactivation of the motor. The inhibition of activation of the motor is cancelled when the accessory is required to move in a direction different from a direction of movement of the accessory during a period preceding the deactivation of the motor.

3 Claims, 3 Drawing Sheets

FIG. 3

| POSITION | CONTACT | | | | | |
|---|---|---|---|---|---|---|
| | +B | 10a | 10b | 10c | 10d | 10e |
| OFF | ◯ | | | | | ◯ |
| ACC | ◯ | | | | ◯ | |
| IG | ◯ | | ◯ | ◯ | | |
| ST | ◯ | ◯ | ◯ | | | |

DRIVE SYSTEM FOR A VEHICLE ACCESSORY

BACKGROUND OF THE INVENTION

1. Field of the Invention

This invention relates to a drive system for a vehicle movable accessory, and especially a drive system for an automotive vehicle outer accessory, such as an antenna, a window glass, or a sun roof.

2. Description of the Prior Art

Japanese published unexamined utility model application 57-185205 discloses a control system for a motor driven rod antenna. In this control system, when the load on an antenna drive motor exceeds a certain level, the supply of an electric current to the motor is interrupted.

Japanese published unexamined utility model application 57-198104 discloses a drive system for a motor antenna mounted on a vehicle. In this drive system, an antenna drive motor is activated in response to a signal from an associated radio receiver power switch or a signal from a relay corresponding to the radio receiver power switch. The drive motor is deactivated in response to a signal from a switch of another sound device, a signal from a vehicle key switch, or signals from relays corresponding to the switch of the sound device and the key switch.

Japanese published examined utility model application 60-42487 discloses a power antenna including a antenna drive motor and limit switches. When an antenna reaches preset positions, these limit switches act to interrupt the electric current supply to the drive motor. This power antenna also includes a timer. In the case of a failure of the limit switches, the timer restricts the duration of the motor current supply to a preset interval.

Japanese published unexamined patent application 60-43903 discloses a motor antenna drive system. In this drive system, the position of an antenna is monitored by an angular position sensor associated with the shaft of an antenna drive motor. When the monitored position of the antenna reaches a given position, the drive motor is deactivated. The given position of the antenna can be selected from the longest position, the shortest position, and a position or positions intermediate between the two limit positions.

Japanese published unexamined patent application 61-18375 discloses a vehicle power window control system. In this control system, load on a window drive motor is monitored. In cases where the window is being closed, when the monitored motor load exceeds a reference level, the drive motor is stopped and is then reversed to open the window. After that, a device included in this control system inhibits activation of the drive motor in the direction of closing the window. The inhibitory operation of this device is cancelled by re-throwing a vehicular engine ignition switch.

SUMMARY OF THE INVENTION

It is an object of this invention to provide a drive system for a vehicle movable accessory which enables reliable self-protection against undesirable locking or sticking of the accessory.

In a vehicle accessory drive system according to a first aspect of this invention, a rotatable motor is connected to a vehicle accessory to move the accessory. The accessory is movable between a first position and a second position. The motor moves the accessory toward the first position and the second position as the motor rotates in a first direction and a second direction respectively. A first operation signal is generated when the accessory is required to move toward the first position. A second operation signal is generated when the accessory is required to move toward the second position. Load on the motor is sensed. A stop signal is generated when the sensed motor load exceeds a reference level. The motor is stopped when the stop signal is generated. A device serves to rotate the motor in the first direction when the first operation signal is generated. A device serves to rotate the motor in the second direction when the second operation signal is generated. Rotation of the motor in the first direction is inhibited in response to the stop signal generated after generation of the first operation signal. The inhibition of rotation of the motor in the second direction is also cancelled in response to the stop signal.

In a vehicle accessory drive system according to a second aspect of this invention, a motor serves to move a vehicle movable accessory. When the accessory is required to move, the motor is activated. Load on the motor is sensed. When the sensed load exceeds a reference level, the motor is deactivated. After the motor is deactivated, a device inhibits activation of the motor which induces movement of the accessory in a direction which is the same as the direction of movement of the accessory during a period prior to the deactivation of the motor. The inhibition of activation of the motor is cancelled when the accessory is required to move in a direction different from the direction of movement of the accessory during the period prior to the deactivation of the motor.

BRIEF DESCRIPTION OF THE DRAWINGS

FIG. 3 is a diagram illustrating connection between contacts of a key switch of FIGS. 1 and 2 in four different positions.

DESCRIPTION OF THE PREFERRED EMBODIMENT

An embodiment of this invention will be described hereinafter. In this embodiment, this invention is applied to a vehicle movable antenna. It should be noted that the invention is not limited to this embodiment and can be applied to other vehicle movable accessories such as a window and a sun roof.

Figure 1:
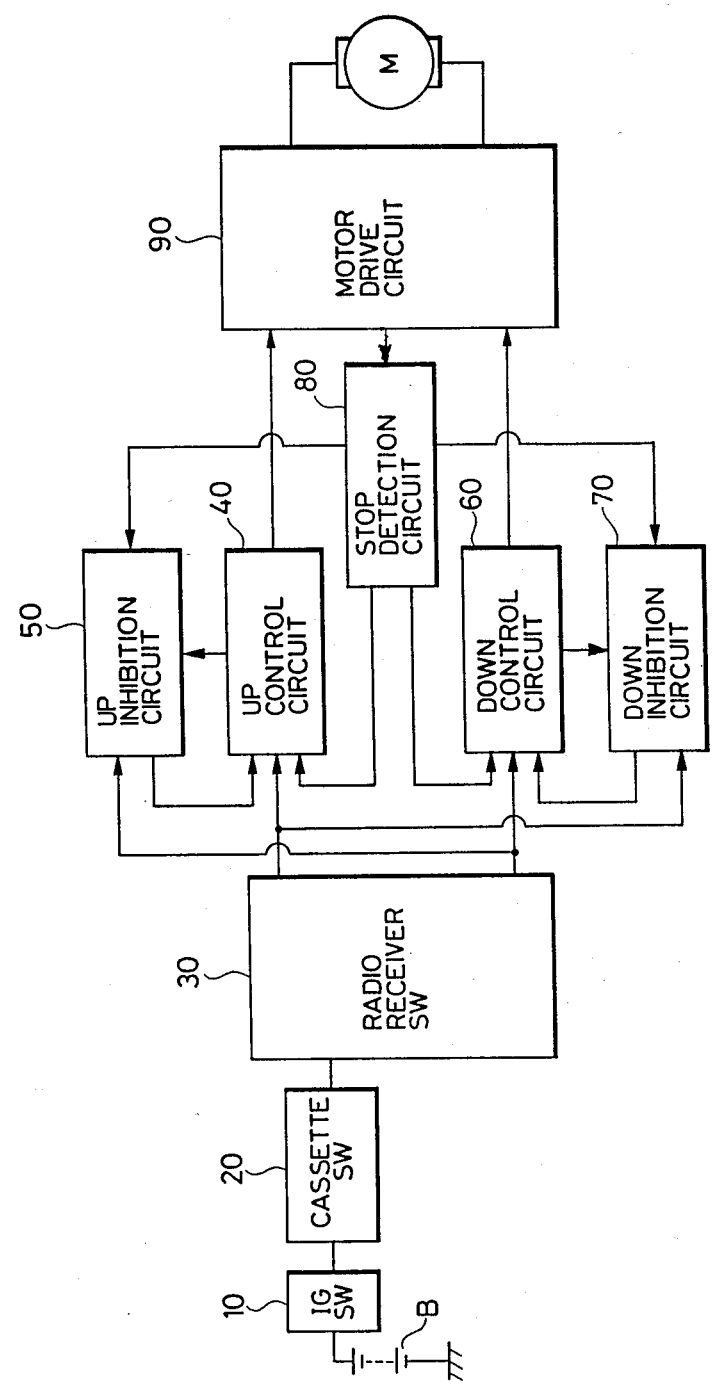
FIG. 1 is a general block diagram of a vehicle accessory drive system according to an embodiment of this invention.

With reference to FIG. 1, a key switch 10, a cassette switch 20, and a radio receiver switch 30 are connected in series. The key switch 10 is connected to an electric dc power source B such as a battery. The cassette switch 20 is actuated when a cassette tape is inserted into and removed from a cassette tape reproducing device or tape deck. The radio receiver switch 30 is connected to a radio receiver (not shown). The radio receiver is normally turned on and off in accordance with movement of the radio receiver switch 30. When the radio receiver switch 30 is actuated to turn on the radio receiver, the radio receiver switch 30 normally serves to generate an antenna extending signal. When the radio receiver switch 30 is actuated to turn off the radio receiver, the radio receiver switch 30 normally serves to generate an antenna shortening signal.

An up control circuit 40 is connected to the radio receiver switch 30 and a motor drive circuit 90. The motor drive circuit 90 is connected to an antenna drive motor M. The motor M is mechanically connected to an extensible or retractable radio receiver rod antenna described hereinafter. When the up control circuit 40 receives an antenna extending signal from the radio receiver switch 30, the circuit 40 outputs a normal rotation signal to the motor drive circuit 90, thereby rotating the motor M in its normal direction and extending the antenna. The up control circuit 40 outputs the normal rotation signal unless a stop signal, described hereinafter, is given.

A stop detection circuit 80 is connected to the up control circuit 40. The stop detection circuit 80 electrically monitors the load on the motor M. When the monitored motor load exceeds a reference level, the stop detection circuit 80 outputs a motor stop signal.

An up inhibition circuit 50 is connected to the radio receiver switch 30, the up control circuit 40, and the stop detection circuit 80. The up inhibition circuit 50 outputs a normal rotation inhibition signal to the up control circuit 40 in response to the stop signal from the stop detection circuit 80. The normal rotation inhibition signal is designed to prevent normal rotation of the motor M. The up inhibition circuit 50 holds the normal rotation inhibition signal until the previously-mentioned antenna shortening signal occurs. When the antenna shortening signal is outputted to the up inhibition circuit 50, the circuit 50 turns off the normal rotation inhibition signal.

A down control circuit 60 is connected to the radio receiver switch 30 and the motor drive circuit 90. When the down control circuit 60 receives an antenna shortening signal from the radio receiver switch 30, the circuit 60 outputs a reverse rotation signal to the motor drive circuit 90, thereby rotating the motor M in its reverse direction and shortening the antenna. The down control circuit 60 outputs the reverse rotation signal unless a stop signal outputted by the stop detection circuit 80 is given.

A down inhibition circuit 70 is connected to the radio receiver switch 30, the down control circuit 60, and the stop detection circuit 80. The down inhibition circuit 70 outputs a reverse rotation inhibition signal to the down control circuit 60 in response to the stop signal from the stop detection circuit 80. The reverse rotation inhibition signal is designed to prevent reverse rotation of the motor M. The down inhibition circuit 70 holds the reverse rotation inhibition signal until the previously-mentioned antenna extending signal occurs. When the antenna extending signal is outputted to the down inhibition circuit 70, the circuit 70 turns off the reverse rotation inhibition signal absent.

Figure 2:
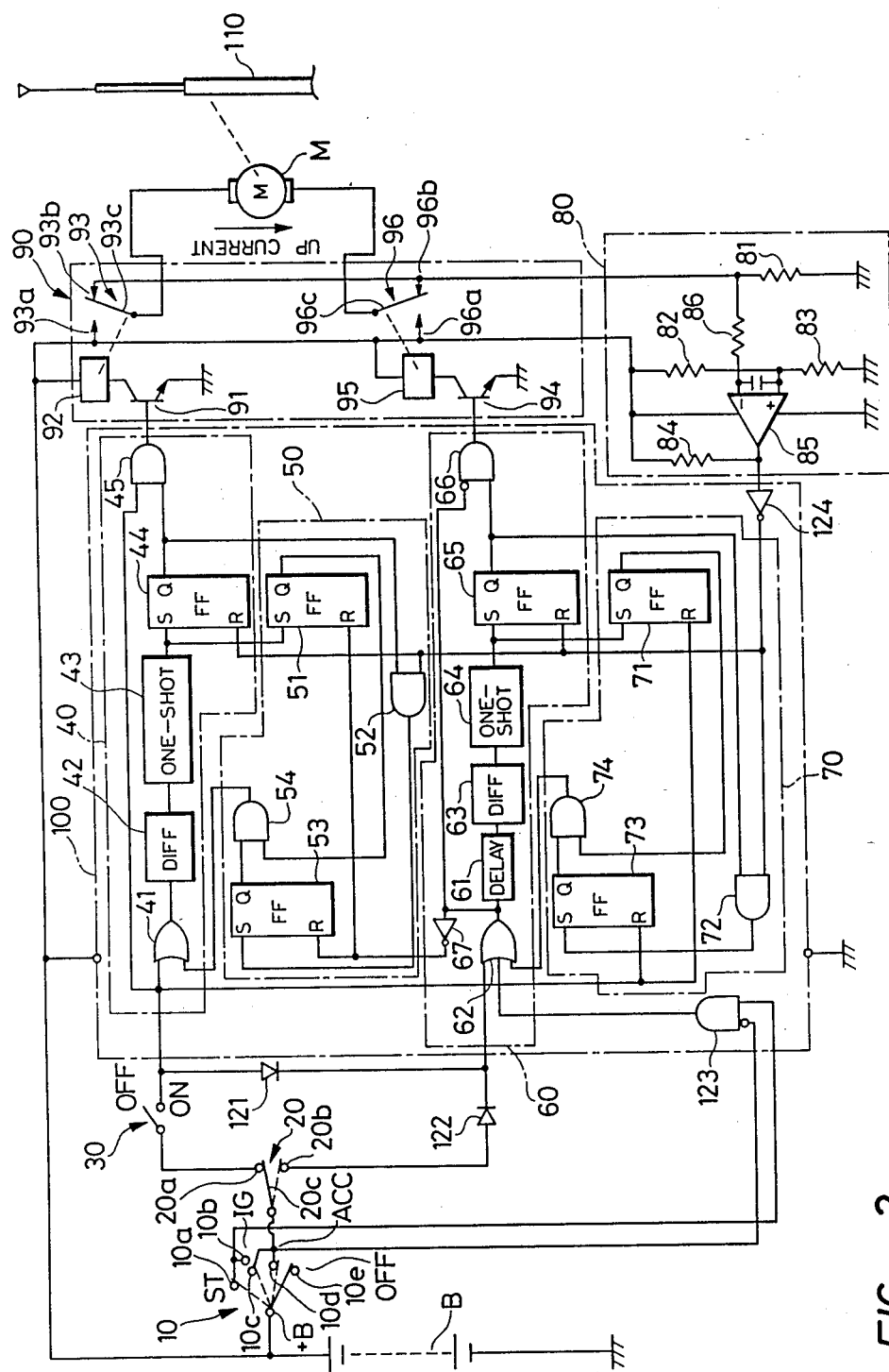
FIG. 2 is a specific block diagram of the vehicle accessory drive system of FIG. 1.

As shown in FIG. 2, the circuits 40, 50, 60, 70, 80, and 90 are continuously powered by the battery B independent of the states of the switches 10, 20, and 30.

The key switch 10 includes a movable contact +B and fixed contacts 10a, 10b, 10c, 10d, and 10e. The movable contact +B is connected to the positive terminal of the battery B. The fixed contact 10a is connected to a vehicular engine starting device (not shown). The fixed contacts 10b and 10c are connected to a vehicular engine ignition device (not shown). The fixed contact 10d is connected to vehicle accessories and a movable contact 20c of the cassette switch 20. The fixed contact 10e is generally isolated. As shown in FIG. 3, the key switch 10 is movable among an OFF position, an ACC position, an IG position, and an ST position. When the key switch 10 assumes the OFF position, the movable contact +B moves into connection with only the fixed contact 10e. When the key switch 10 assumes the ACC position, the movable contact +B moves into connection with only the fixed contact 10d, applying the voltage of the battery B to the vehicle accessories and the cassette switch 20. When the key switch 10 assumes the IG position, the movable contact +B moves into connnection with the fixed contacts 10b and 10c, applying the battery voltage to the engine ignition device, the vehicle accessories, and the cassette switch 20. When the key switch 10 assumes the ST position, the movable contact +B moves into connection with the fixed contacts 10a and 10b, applying the battery voltage to the engine starting device and the engine ignition device.

The cassette switch 20 includes fixed contacts 20a and 20b, and a movable contact 20c. As described previously, the movable contact 20c is connected to the fixed contact 10d of the key switch 10. When a cassette tape is inserted into the associated reproducing device, the movable contact 20c is connected to the fixed contact 20b but is disconnected from the fixed contact 20a. When a cassette tape is removed from the associated reproducing device, the movable contact 20c is connected to the fixed contact 20a but is disconnected from the fixed contact 20b. The fixed contact 20a is connected to the radio receiver switch 30. The fixed contact 20b is connected to the down control circuit 60 via a diode 122.

Provided that the key switch 10 is in the ACC position or the IG position, the radio receiver is turned on and off when the radio receiver switch 30 is closed and opened respectively. The radio receiver switch 30 is connected to the up control circuit 40 and the down inhibition circuit 70. The radio receiver switch 30 is also connected to the down control circuit 60 via a diode 121.

A main circuit 100 controlling the motor drive circuit 90 includes the up control circuit 40, the up inhibition circuit 50, the down control circuit 60, and the down inhibition circuit 70.

As described previously, the shaft of the motor M is mechanically connected to an extensible or retractable radio receiver rod antenna 110 via a known gear arrangement or drive train. When the shaft of the motor M rotates in a first direction and in a second direction, the antenna 110 is extended and shortened respectively.

The up control circuit 40 includes an OR gate 41, a differentiating circuit 42, a one-shot multivibrator 43, a flip-flop (FF) 44, and an AND gate 45. A first input terminal of the OR gate 41 is connected to the radio receiver switch 30. A second input terminal of the OR gate 41 is connected to an output terminal of an AND gate 54 within the up inhibition circuit 50. An output terminal of the OR gate 41 is connected to an input terminal of the differentiating circuit 42. The differentiating circuit 42 detects a rising edge of an output signal from the OR gate 41. An output terminal of the differentiating circuit 42 is connected to an input terminal of the one-shot multivibrator 43. The one-shot multivibrator 43 wave-shapes an output signal from the differentiating circuit 42 and outputs a set pulse having a fixed duration. An output terminal of the one-shot multivibrator 43 is connected to a set terminal of the flip-flop 44.

A reset terminal of the flip-flop 44 is connected to the stop detection circuit 80 via an inverter 124. In the flip-flop 44, set operation takes precedence over reset operation. When the set terminal of the flip-flop 44 receives a high level signal from the one-shot multivibrator 43, the flip-flop 44 is set and generates a high level signal via its Q output terminal. When the reset terminal of the flip-flop 44 receives a stop signal from the stop detection circuit 80, the flip-flop 44 is reset and generates a low level signal via its Q output terminal. The Q output terminal of the flip-flop 44 is connected to a first input terminal of the AND gate 45. A second input terminal of the AND gate 45 is connected to the radio receiver switch 30. An output terminal of the AND gate is connected to the motor drive circuit 90.

The up inhibition circuit 50 includes a flip-flop 51, an AND gate 52, a flip-flop 53, and an AND gate 54. A set terminal of the flip-flop 51 is connected to the output terminal of the one-shot multivibrator 43 within the up control circuit 40. In the flip-flop 51, set operation takes precedence over reset operation. A first input terminal of the AND gate 52 is connected to the Q output terminal of the flip-flop 44 within the up control circuit 40. A second input terminal of the AND gate 52 is connected to the stop detection circuit 80 via the inverter 124. A set terminal of the flip-flop 53 is connected to an output terminal of the AND gate 52. In the flip-flop 53, set operation takes precedence over reset operation. A first input terminal of the AND gate 54 is connected to a Q output terminal of the flip-flop 53. A second input terminal of the AND gate 54 is connected to a Q output terminal of the flip-flop 51. As described previously, an output terminal of the AND gate 54 is connected to the OR gate 41 within the up control circuit 40. When the set terminal of the flip-flop 51 receives a high level signal from the one-shot multivibrator 43 within the up control circuit 40, the flip-flop 51 is set and generates a high level signal via its Q output terminal. When the set terminal of the flip-flop 53 receives a high level signal from the AND gate 52, the flip-flop 53 is set and generates a high level signal via its Q output terminal. The AND gate 52 is caused to output a high level signal by a stop signal from the stop detection circuit 80 and a signal outputted from the Q output terminal of the flip-flop 44 at a moment immediately prior to the moment of resetting of the flip-flop 44 by the stop signal. The AND gate 54 outputs a high level signal as a motor normal rotation inhibition signal when both of the flip-flops 51 and 53 are in their set states. Reset terminals of the flip-flops 51 and 53 are connected to an output terminal of an inverter 67 within the down control circuit 60. When the reset terminals of the flip-flops 51 and 53 receive a high level signal from the inverter 67, the flip-flops 51 and 53 are reset and remove or cancel the motor normal rotation inhibition signal.

The down control circuit 60 includes a delay circuit 61, an OR gate 62, a differentiating circuit 63, a one-shot multivibrator 64, a flip-flop 65, an AND gate 66, and the inverter 67. A first input terminal of the OR gate 62 is connected to the radio receiver switch 30 via the diode 121. The first input terminal of the OR gate 62 is also connected to the fixed contact 20b of the cassette switch 20 via the diode 122. A second input terminal of the OR gate 62 is connected to an output terminal of an AND gate 123. An inverting input terminal of the AND gate 123 is connected to the fixed contact 10c of the key switch 10. A non-inverting input terminal of the AND gate 123 is connected to the fixed contacts 10a and 10b.

A third input terminal of the OR gate 62 is connected to an output terminal of an AND gate 74 within the down inhibition circuit 70. An input terminal of the delay circuit 61 is connected to an output terminal of the OR gate 62. An input terminal of the differentiating circuit 63 is connected to an output terminal of the delay circuit 61. The differentiating circuit 63 detects a falling edge of an output signal from the delay circuit 61. An input terminal of the one-shot multivibrator 64 is connected to an output terminal of the differentiating circuit 63. The one-shot multivibrator 64 wave-shapes an output signal from the differentiating circuit 63 and outputs a set pulse having a fixed duration. In the flip-flop 65, set operation takes precedence over reset operation. A set terminal of the flip-flop 65 is connected to an output terminal of the one-shot multivibrator 64. A reset terminal of the flip-flop 65 is connected to the stop detection circuit 80 via the inverter 124. A non-inverting input terminal of the AND gate 66 is connected to a Q output terminal of the flip-flop 65. An inverting input terminal of the AND gate 66 is connected to the output terminal of the OR gate 62. An output terminal of the AND gate 66 is connected to the motor drive circuit 90. An input terminal of the inverter 67 is connected to the output terminal of the OR gate 62. The device 67 inverts an output signal from the OR gate 62. When the set terminal of the flip-flop 65 receives a high level signal from the one-shot multivibrator 64, the flip-flop 65 is set and generates a high level signal via its Q output terminal. When the reset terminal of the flip-flop 65 receives a stop signal from the stop detection circuit 80, the flip-flop 65 is reset and generates a low level signal via its Q output terminal.

The down inhibition circuit 70 includes a flip-flop 71, an AND gate 72, a flip-flop 73, and an AND gate 74. A set terminal of the flip-flop 71 is connected to the output terminal of the one-shot multivibrator 64 within the down control circuit 60. A reset terminal of the flip-flop 71 is connected to the radio receiver switch 30. In the flip-flop 71, set operation takes precedence over reset operation. When the set terminal of the flip-flop 71 receives a high level signal from the one-shot multivibrator 64, the flip-flop 71 is set and generates a high level signal via its Q output terminal. A first input terminal of the AND gate 72 is connected to the Q output terminal of the flip-flop 65 within the down control circuit 60. A second input terminal of the AND gate 72 is connected to the stop detection circuit 80 via the inverter 124. The AND gate 72 is caused to output a high level signal by a stop signal from the stop detection circuit 80 and a signal outputted from the Q output terminal of the flip-flop 65 at a moment immediately prior to the moment of resetting of the flip-flop 65 by the stop signal. A set terminal of the flip-flop 73 is connected to an output terminal of the AND gate 72. A reset terminal of the flip-flop 73 is connected to the radio receiver switch 30. In the flip-flop 73, set operation takes precedence over reset operation. When the set terminal of the flip-flop 73 receives a high level signal from the AND gate 72, the flip-flop 73 is set and generates a high level signal via its Q output terminal. A first input terminal of the AND gate 74 is connected to the Q output terminal of the flip-flop 71. A second input terminal of the AND gate 74 is connected to the Q output terminal of the flip-flop 73. As described previously, an output terminal of the AND gate 74 is connected to the OR gate 62 within the down control circuit 60. The AND gate 74 outputs a high level signal as a motor reverse rotation inhibition signal when both of the flip-flops 71 and 73 are in their set states. When the reset terminals of the flip-flops 71 and 73 receive a high level signal from the radio receiver switch 30, the flip-flops 71 and 73 are reset and generate respective low level signals via their Q output terminals, removing or cancelling the reverse rotation inhibition signal outputted by the AND gate 74.

The motor drive circuit 90 includes a transistor 91, an electromagnetic winding or relay winding 92, a relay switch 93, a transistor 94, an electromagnetic winding or relay winding 95, and a relay switch 96. The base of the transistor 91 is connected to the output terminal of the AND gate 45 within the up control circuit 40. The emitter-collector path of the transistor 91 is connected across the battery B via the relay winding 92. When a high level signal is applied to the base of the transistor 91 from the AND gate 45, the transistor 91 is made conductive so that the relay winding 92 is energized by the battery B. When a low level signal is applied to the base of the transistor 91 from the AND gate 45, the transistor 91 is made non-conductive so that the relay winding 92 is de-energized. The relay switch 93 includes fixed contacts 93a and 93b, and a movable contact 93c. The fixed contact 93a is connected to the positive terminal of the battery B. The fixed contact 93b is connected to the stop detection circuit 80. The movable contact 93c is connected to a first terminal of the motor M. The relay switch 93 is associated with the relay winding 92. When the relay winding 92 is de-energized, the movable contact 93c is connected to the fixed contact 93b but is disconnected from the fixed contact 93a. When the relay winding 92 is energized, the movable contact 93c is connected to the fixed contact 93a but is disconnected from the fixed contact 93b so that an electric current produced by the battery B is generally allowed to flow through the motor M to rotate the motor M in its normal direction.

The base of the transistor 94 is connected to the output terminal of the AND gate 66 within the down control circuit 60. The emitter-collector path of the transistor 94 is connected across the battery B via the relay winding 95. When a high level signal is applied to the base of the transistor 94 from the AND gate 66, the transistor 94 is made conductive so that the relay winding 95 is energized by the battery B. When a low level signal is applied to the base of the transistor 94 from the AND gate 66, the transistor 94 is made non-conductive so that the relay winding 95 is de-energized. The relay switch 96 includes fixed contacts 96a and 96b, and a movable contact 96c. The fixed contact 96a is connected to the positive terminal of the battery B. The fixed contact 96b is connected to the stop detection circuit 80. The movable contact 96c is connected to a second terminal of the motor M. The relay switch 96 is associated with the relay winding 95. When the relay winding 95 is de-energized, the movable contact 96c is connected to the fixed contact 96b but is disconnected from the fixed contact 96a. When the relay winding 95 is energized, the movable contact 96c is connected to the fixed contact 96a but is disconnected from the fixed contact 96b so that an electric current produced by the battery B is generally allowed to flow through the motor M to rotate the motor M in its reverse direction.

The stop detection circuit 80 includes resistors 81, 82, 83, and 84, a comparator 85, a resistor 86, and a capacitor 87. A first end of the resistor 81 is connected to the fixed contacts 93b and 96b of the relay switches 93 and 96 within the motor drive circuit 90. The first end of the resistor 81 is also connected to a first input terminal of the comparator 85 via the resistor 86. A second end of the resistor 81 is connected to the negative terminal of the battery B via the ground. The resistor 81 senses load on the motor M. Specifically, an electric current flowing through the motor M passes through the resistor 81 so that the voltage across the resistor 81 represents the current flowing through the motor M. Since the current flowing through the motor M reflects the load on the motor M, the voltage across the resistor 81 represents the load on the motor M. The voltage across the resistor 81 will be called a motor load voltage hereinafter. The motor load voltage is applied to the first input terminal of the comparator 85. The resistors 82 and 83 are connected in series. The series combination of the resistors 82 and 83 is connected across the battery B. The junction between the resistors 82 and 83 is connected to a second input terminal of the comparator 85. The series combination of the resistors 82 and 83 divides the constant battery voltage and derives a reference constant voltage induced across the resistor 83. The reference constant voltage is applied to the second input terminal of the comparator 85. The reference constant voltage corresponds to a reference load on the motor M. When the motor load voltage is equal to or higher than the reference voltage, that is, when load on the motor M is equal to or greater than the reference load, the comparator 85 outputs a low level signal. When the motor load voltage is lower than the reference voltage, that is, when load on the motor M is smaller than the reference load, the comparator 85 outputs a high level signal. An output terminal of the comparator 85 is connected to an input terminal of the inverter 124. An output terminal of the inverter 124 is connected to the flip-flop 44 within the up control circuit 40, the AND gate 52 within the up inhibition circuit 50, the flip-flop 65 within the down control circuit 60, and the AND gate 72 within the down inhibition circuit 70. The comparator 85 is connected to the battery B so that the comparator 85 is powered by the battery B. The output terminal of the comparator 85 is connected to the positive terminal of the battery B via the resistor 84. Opposite ends of the capacitor 87 are connected to the first and second input terminals of the comparator 85 respectively.

During activation of the motor M, when the antenna 110 sticks or becomes locked due to some causes, the load on the motor M generally increases above the reference load so that the comparator 85 outputs a low level signal. This low level signal is converted by the inverter 124 into a high level stop signal. During activation of the motor M, when the antenna 110 is moving normally, the load on the motor M remains below the reference load so that the comparator 85 outputs a high level signal and thus a stop signal is absent.

When the key switch 10 is changed from the IG position to the ST position, the AND gate 123 outputs a high level signal to the down control circuit 60, thereby preventing the antenna 110 from being shortened. The high level signal outputted from the AND gate 123 to the down control circuit 60 also prevents the inhibition of antenna extending operation from being cancelled.

The vehicle accessory drive system of FIGS. 1–3 operates as follows.

[Up Operation]

In cases where the key switch 10 is in the ACC position or the IG position and where a cassette tape is removed from the cassete tape reproducing device so that the cassette switch movable contact 20c is connected to the cassette switch fixed contact 20a, when the radio receiver switch 30 is closed to turn on the radio receiver, an antenna extending signal consisting of a change from a low level to a high level is outputted via the radio receiver switch 30. In the up control circuit 40, an output signal of the OR gate 41 changes from a low level to a high level in response to the antenna extending signal, so that the differentiating circuit 42 outputs a pulse. This pulse from the differentiating circuit 42 is converted into a fixed duration pulse by the one-shot multivibrator 43. The fixed duration pulse from the one-shot multivibrator 43 sets the flip-flop 44 and the flip-flop 51 within the up inhibition circuit 50, so that high level signals are generated at the Q output terminals of these flip-flops 44 and 51. The high level signal from the flip-flop 44 allows the AND gate 45 to output a high level signal as a normal rotation signal, which makes the transistor 91 conductive. When the transistor 91 is made conductive, the relay winding 92 is energized so that the relay switch movable contact 93c is connected to the relay switch fixed contact 93a. The connection of the movable contact 93c to the fixed contact 93a allows the battery B to supply a normally directed electric current to the motor M, thereby rotating the motor M in its normal direction and extending the antenna 110.

[Suspension of Up Operation]

In cases where the motor M is rotated in its normal direction, when the antenna 110 is fully extended so that the motor M is locked, or when the antenna 110 sticks or becomes locked due to freezing or the like so that the motor M is locked, load on the motor M increases and thus the stop detection circuit 80 allows the inverter 124 to output a high level stop signal. This stop signal is applied to the reset terminal of the flip-flop 44, so that the flip-flop 44 is reset and the potential at the Q output terminal of the flip-flop 44 goes low. When the output signal from the flip-flop 44 goes low, the AND gate 45 is closed and thus the normal rotation signal from the AND gate 45 is made absent. As a result, the transistor 91 is made non-conductive and the relay winding 92 is de-energized. The de-energization of the relay winding 92 disconnects the relay switch movable contact 93c from the relay switch fixed contact 93a, thereby interrupting the electric current supply to the motor M and suspending the normal rotation of the motor M.

Immediately before the potential at the Q output terminal of the flip-flop 44 changes to a low level which causes the suspension of the normal rotation of the motor M, the stop signal outputted by the inverter 124 and the high level signal generated at the Q output terminal of the flip-flop 44 allow the AND gate 52 to output a pulse signal. The pulse signal from the AND gate 52 sets the flip-flop 53 so that a high level signal is generated at the Q output terminal of the flip-flop 53. Accordingly, the AND gate 54 receives the high level signals from the flip-flops 51 and 53, outputting a high level signal to the OR gate 41 as a normal rotation inhibition signal. The normal rotation inhibition signal lasts until the flip-flops 51 and 53 are reset.

During the presence of the normal rotation inhibition signal, even when an antenna extending high level signal is outputted via the radio receiver switch 30 again, the differentiating circuit 42 does not respond to the antenna extending signal so that the supply of a normally directed electric current to the motor M is prevented. Thus, in the case where the motor M is locked during or after the normal rotation, the supply of a normally directed electric current to the motor M is inhibited after the locking of the motor M. For example, an antenna extending high level signal is outputted again by rethrowing the key switch 10 while holding the radio receiver switch 30 closed. Also, an antenna extending high level signal is outputted again by actuating the cassette switch 20 while holding the radio receiver switch 30 closed.

[Down Operation]

In cases where the key switch 10 is in the ACC position or the IG position and where a cassette tape is removed from the cassette tape reproducing device so that the cassette switch movable contact 20c is connected to the cassette switch fixed contact 20a, when the radio receiver switch 30 is opened to turn off the radio receiver, an antenna shortening signal consisting of a change from a high level to a low level is outputted via the radio receiver switch 30. In the down control circuit 60, an output signal of the OR gate 62 changes from a high level to a low level in response to the antenna shortening signal. This change in the output signal from the OR gate 62 is transmitted to the differentiating circuit 63 via the delay circuit 61, so that the differentiating circuit 63 outputs a pulse. This pulse from the differentiating circuit 63 is converted into a fixed duration pulse by the one-shot multivibrator 64. The fixed duration pulse from the one-shot multivibrator 64 sets the flip-flop 65 and the flip-flop 71 within the down inhibition circuit 70, so that high level signals are generated at the Q output terminals of these flip-flops 65 and 71. The high level signal from the flip-flop 65 allows the AND gate 66 to output a high level signal as a reverse rotation signal, which makes the transistor 94 conductive. When the transistor 94 is made conductive, the relay winding 95 is energized so that the relay switch movable contact 96c is connected to the relay switch fixed contact 96a. The connection of the movable contact 96c to the fixed contact 96a allows the battery B to supply a reversely directed electric current to the motor M, thereby rotating the motor M in its reverse direction and shortening the antenna 110.

The antenna shortening signal is also transmitted to the reset terminals of the flip-flops 51 and 53 within the up inhibition circuit 50 via the OR gate 62 and the inverter 67, so that the flip-flops 51 and 53 are reset. When the flip-flops 51 and 53 are reset, the normal rotation inhibition signal outputted by the AND gate 54 is cancelled or removed.

[Suspension of Down Operation]

In cases where the motor M is rotated in its reverse direction, when the antenna 110 is fully shortened or retracted so that the motor M is locked, or when the antenna 110 sticks or becomes locked due to freezing or the like so that the motor M is locked, load on the motor M increases and thus the stop detection circuit 80 allows the inverter 124 to output a high level stop signal. This stop signal is applied to the reset terminal of the flip-flop 65, so that the flip-flop 65 is reset and the potential at the Q output terminal of the flip-flop 65 goes low. When the output signal from the flip-flop 65 goes low, the AND gate 66 is closed and thus the reverse rotation signal from the AND gate 66 is removed. As a result, the transistor 94 is made non-conductive and the relay winding 95 is de-energized. The de-energization of the relay winding 95 disconnects the relay switch movable contact 96c from the relay switch fixed contact 96a, thereby interrupting the electric current supply to the motor M and suspending the reverse rotation of the motor M.

Immediately before the potential at the Q output terminal of the flip-flop 65 changes to a low level which causes the suspension of the reverse rotation of the motor M, the stop signal outputted by the inverter 124 and the high level signal generated at the Q output terminal of the flip-flop 65 allow the AND gate 72 to output a pulse signal. The pulse signal from the AND gate 72 sets the flip-flop 73 so that a high level signal is generated at the Q output terminal of the flip-flop 73. Accordingly, the AND gate 74 receives the high level signals from the flip-flops 71 and 73, outputting a high level signal to the OR gate 62 as a reverse rotation inhibition signal. The reverse rotation inhibition signal lasts until the flip-flops 71 and 73 are reset.

During the presence of the reverse rotation inhibition signal, even when an antenna shortening signal is outputted again, the differentiating circuit 63 does not respond to the antenna shortening signal so that the supply of a reversely directed electric current to the motor M is prevented. Thus, in the case where the motor M is locked during or after the reverse rotation, the supply of a reversely directed electric current to the motor M is inhibited after the locking of the motor M.

The flip-flops 71 and 73 within the down inhibition circuit 70 are reset by a subsequent antenna extending signal outputted via the radio receiver switch 30. When the flip-flops 71 and 73 are reset, the reverse rotation inhibition signal outputted by the AND gate 74 is cancelled or removed. In the case where the reverse inhibition signal is absent, when the key switch 10 is moved to the OFF position, the down control circuit 60 and the motor drive circuit 90 allow a reversely directed electric current to flow through the motor M independent of the states of the cassette switch 20 and the radio receiver switch 30. This supply of the reversely directed current to the motor M continues until the antenna 110 is fully shortened or retracted.

As described previously, in cases where the antenna 110 is being extended or shortened, when the antenna 110 sticks or becomes locked due to freezing or the like, the activation of the motor M is suspended. Simultaneously, the up inhibition circuit 50 or the down inhibition circuit 70 generates a motor rotation inhibition signal which prevents or forbids the rotation of the motor M in the same direction as the direction of the rotation of the motor M during the period preceding the suspension of the activation of the motor M. This motor rotation inhibition signal lasts until a signal designed to rotate the motor M in the opposite direction is produced. In this way, after the antenna 110 sticks or becomes locked, the motor M is prevented from undergoing an electric current angularly forcing the motor M in the same direction as the direction of the rotation of the motor M during a period preceding the locking of the antenna 110. Accordingly, an abnormal or excessive electric current is prevented from flowing through the relay switches 93 and 96, so that long sevice lives of the switches 93 and 96 can be ensured.

To cancel the inhibition of the activation of the motor M, it is necessary to produce a signal designed to rotate the motor M in the direction opposite to the direction of the rotation of the motor M during a period preceding the locking of the antenna 110. Accordingly, in cases where the motor M is rotated in the same direction as the direction of the rotation of the motor M during a period preceding the locking of the antenna 110, the motor M needs to be rotated in the opposite direction before the motor M is rotated in the same direction as the direction of the rotation of the motor M during a period preceding the locking of the antenna 110. This rotation of the motor M in the opposite direction relieves stresses on the antenna 110 and the gear arrangement between the motor M and the antenna 110. Therefore, in cases where the motor M is rotated in the same direction as the direction of the rotation of the motor M during a period preceding the locking of the antenna 110 so that the motor M moves again into the same locked state, the motor M and the gear arrangement between the motor M and the antenna 110 are prevented from undergoing stronger stresses.

It should be noted that modifications may be made in the embodiment of FIGS. 1–3. For example, one of the up inhibition circuit 50 and the down inhibition circuit 70 may be omitted from the embodiment of FIGS. 1–3. In addition, a motor rotation inhibition signal outputted by the up inhibition circuit 50 or the down inhibition circuit 70 may be automatically removed or cancelled at a moment following the occurrence of the inhibition signal by a preset time interval determined by a device such as a timer.

What is claimed is:

1. A drive system for a vehicle accessory exposed to atmosphere and being movable between a first position and a second position, the system comprising:
    (a) a rotatable motor connected to the accessory and moving the accessory toward the first position and the second position as the motor rotates in a first direction and a second direction respectively;
    (b) means for generating a first operation signal when the accessory is required to move toward the first position;
    (c) means for generating a second operation signal when the accessory is required to move toward the second position;
    (d) means for sensing load on the motor;
    (e) means for generating a stop signal when the sensed motor load exceeds a reference level;
    (f) means for stopping the motor when the stop signal is generated;
    (g) means for rotating the motor in the first direction when the first operation signal is generated;
    (h) means for rotating the motor in the second direction when the second operation signal is generated;
    (i) means for inhibiting rotation of the motor in the first direction in response to the stop signal generated after generation of the first operation signal; and;
    (j) means for cancelling the inhibition of rotation of the motor in the first direction in response to the second operation signal.

2. The drive system of claim 2 further comprising means for inhibiting rotation of the motor in the second direction in response to the stop signal generated after generation of the second operation signal, and means for cancelling the inhibition of rotation of the motor in the second direction in response to the first operation signal.

3. A drive system for a vehicle movable accessory comprising:
 (a) means for moving the accessory;
 (b) means for activating the moving means when the accessory is required to move;
 (c) means for sensing load on the moving means;
 (d) means for deactivating the moving means when the sensed load exceeds a reference level;
 (e) means for, after the moving means is deactivated, inhibiting activation of the moving means which induces movement of the accessory in a direction same as a direction of movement of the accessory during a period preceding the deactivation of the moving means; and
 (f) means for cancelling the inhibition of activation of the moving means when the accessory is required to move in a direction different from the direction of movement of the accessory during the period preceding the deactivation of the moving means.

* * * * *